INVENTOR
J. LIGHTSEY WALLACE, JR.
BY Lipton D. Jennings
ATTORNEY

INVENTOR
J. LIGHTSEY WALLACE, JR.
BY Tipton D. Jennings
ATTORNEY

INVENTOR

J. LIGHTSEY WALLACE, JR.

BY Tipton D. Jennings

ATTORNEY

INVENTOR
J. LIGHTSEY WALLACE, JR.
BY Lipton D. Jennings
ATTORNEY 3,341,666

ELECTRONIC REPERTORY DIALING TRANSMITTING DEVICE USING D.C. PULSES

Jacob Lightsey Wallace, Jr., Springfield, Va., assignor to Atlantic Research Corporation, Fairfax County, Va., a corporation of Virginia Filed May 28, 1964, Ser. No. 370,780
14 Claims. (Cl. 179—90)

Figure 1:
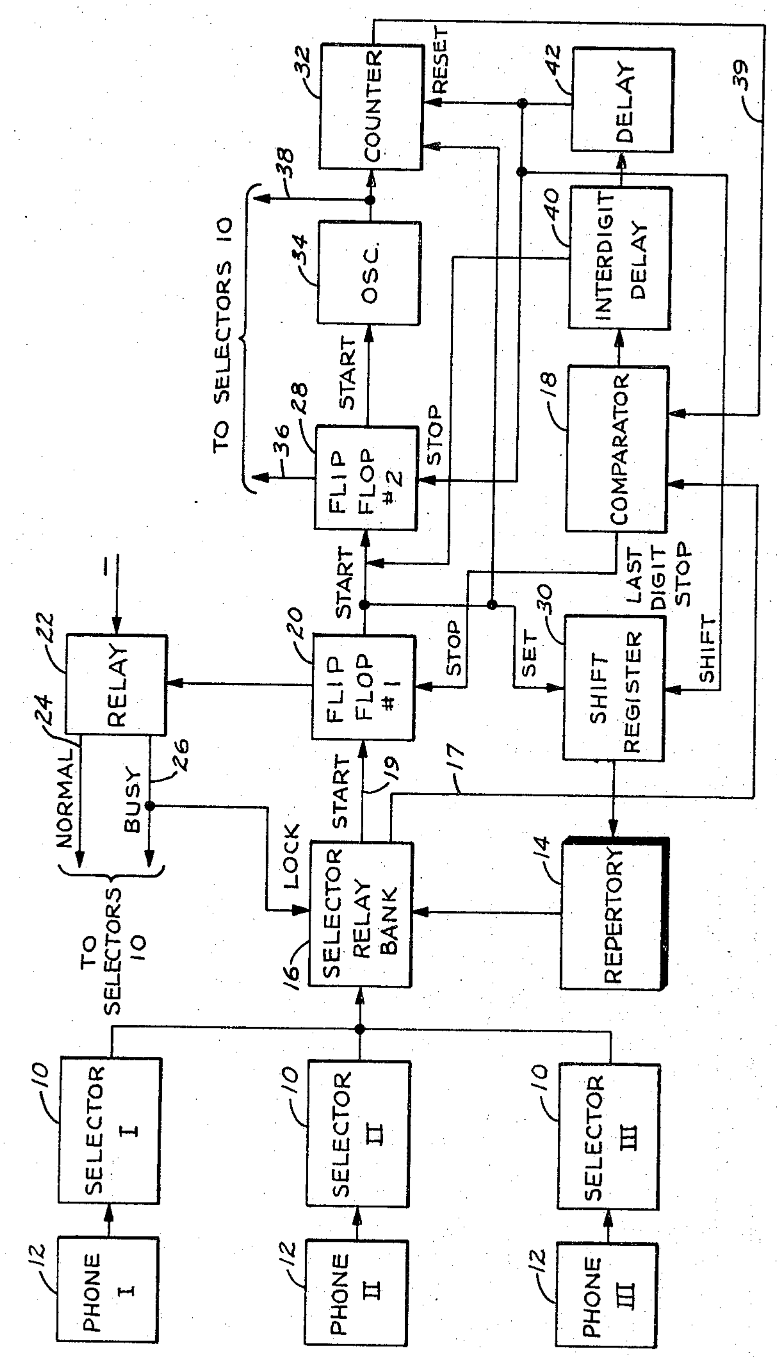

This invention relates, in general, to electronic transmitting devices, and is particularly concerned with that types of electronic transmitting device which automatically calls an address or telephone number without the necessity of having to manually select each digit of the address. These call-selecting devices are commonly known as repertory dialing systems when used with automatic telephone systems.

Today, in the case of a great many subscribers, a large portion of their calls are made to a limited number of stations and of these there are usually a few stations which are repeatedly called. In those situations where the subscribers' telephones are connected to an automatic exchange, it is necessary for the calling party to go through the time-consuming operation of manipulating a calling dial successively the number of times corresponding to the number of digits in the called address. In many areas, seven digits comprise an address, each one of which must be successively selected on the dial and the dial rotated to transmit the desired number of impulses associated with that particular digit. With the advent of direct long-distance dialing, three additional digits must also be selected on the dial. Obviously, this repeated manipulation is a time-consuming operation and is conducive to errors in dialing. By the use of the present repertory dialing device the necessity of having to manually dial each digit of the address or telephone number is eliminated.

In the past, several approaches have been taken in the design of repertory dialers. Attachments to the telephone set have been proposed which physically manipulate the dial for each digit by inserting a member into the appropriate opening of the finger wheel, rotating it the required amount and withdrawing the member to release the wheel. Other dialers use coded discs which rotate to produce pulses similar to dial pulses. Still others use a storage medium such as a drum or tape having magnetic patterns stored thereon which reproduce the dial pulses during readout. All of these dialers employ considerable amount of mechanical equipment which has been found to be necessary to effect operation of these prior art devices. There is instead provided here a repertory dialer which is predominantly electronic and which is not burdened with a mass of moving mechanical parts other than a limited number of electro-mechanical relays.

Accordingly, an object of this invention is to provide an improved repertory dialer which is primarily electronic in construction permitting accurate and efficient call-selection.

Another object of the invention is to provide, in conjunction with an automatic telephone system, a repertory dialing apparatus having a memory which can be readily encoded to form the addresses or call numbers.

Still another object is the provision of a repertory dialer common to a plurality of separate telephone instruments permitting individual selection of the numbers within the repertory at the various telephone instruments to operate the dialer.

A further object is to provide repertory dialing apparatus which is compatible with existing automatic telephone systems and which may be used in conjunction with existing telephone instruments without interfering with the conventional operation thereof.

Another object is to provide repertory apparatus common to a plurality of stations permitting individual selection at the various stations of addresses in repertory to initiate and control the output of the repertory apparatus.

Another object of the present invention is to provide a memory unit which is readily programmed to encode an address and which can be combined with other memory units to form the repertory.

Figure 2:
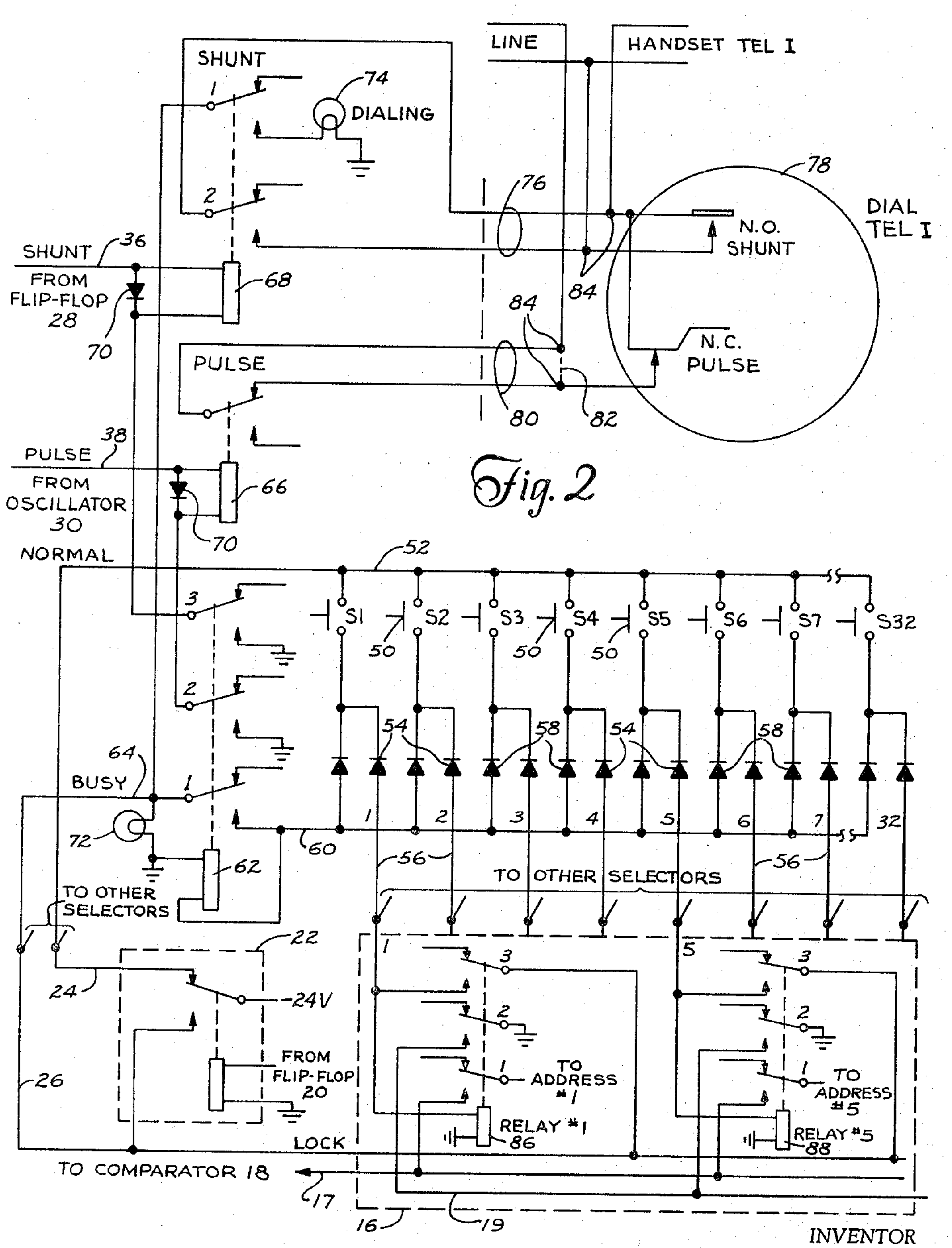
Figure 3:
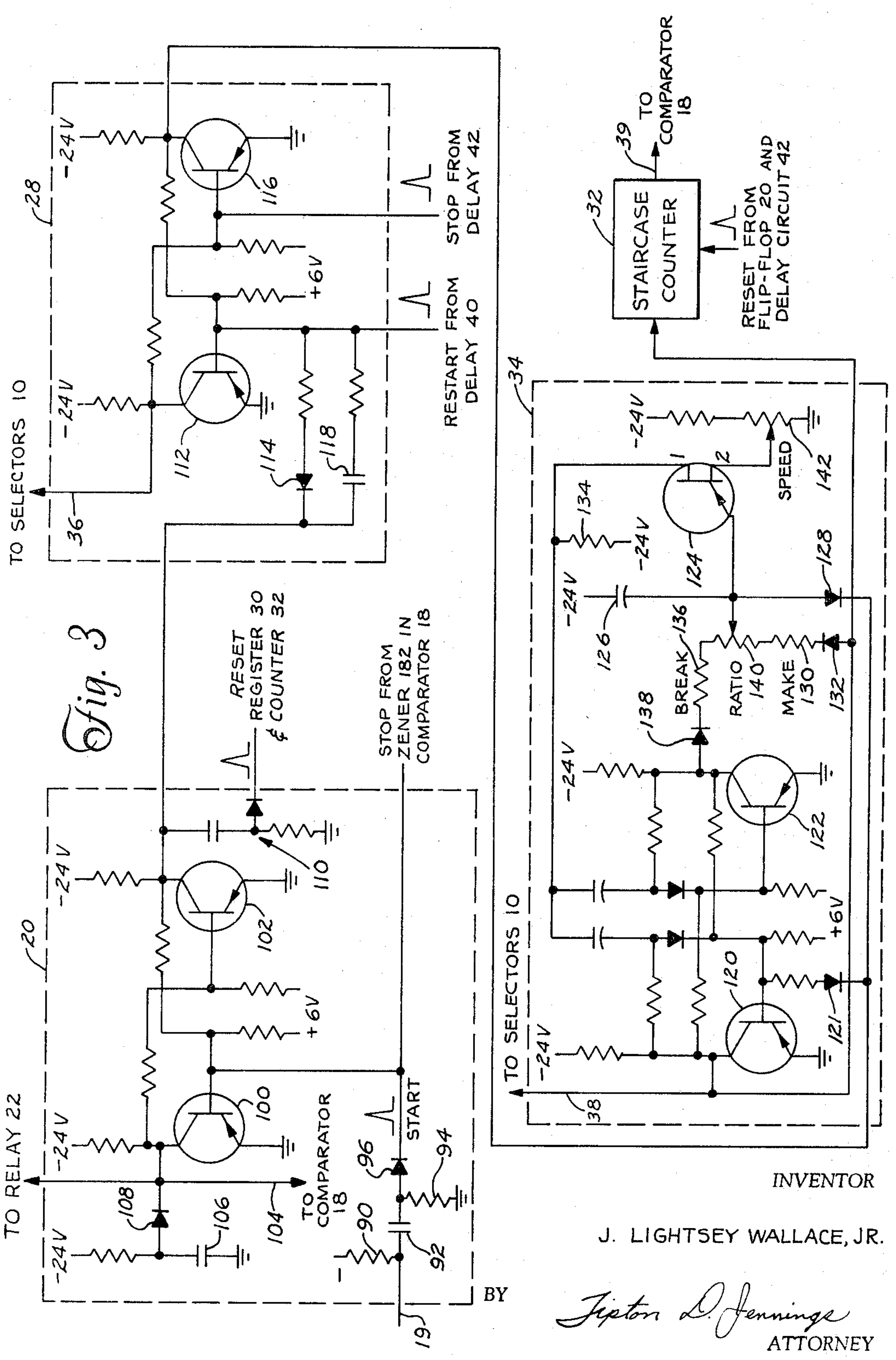
Figure 4:
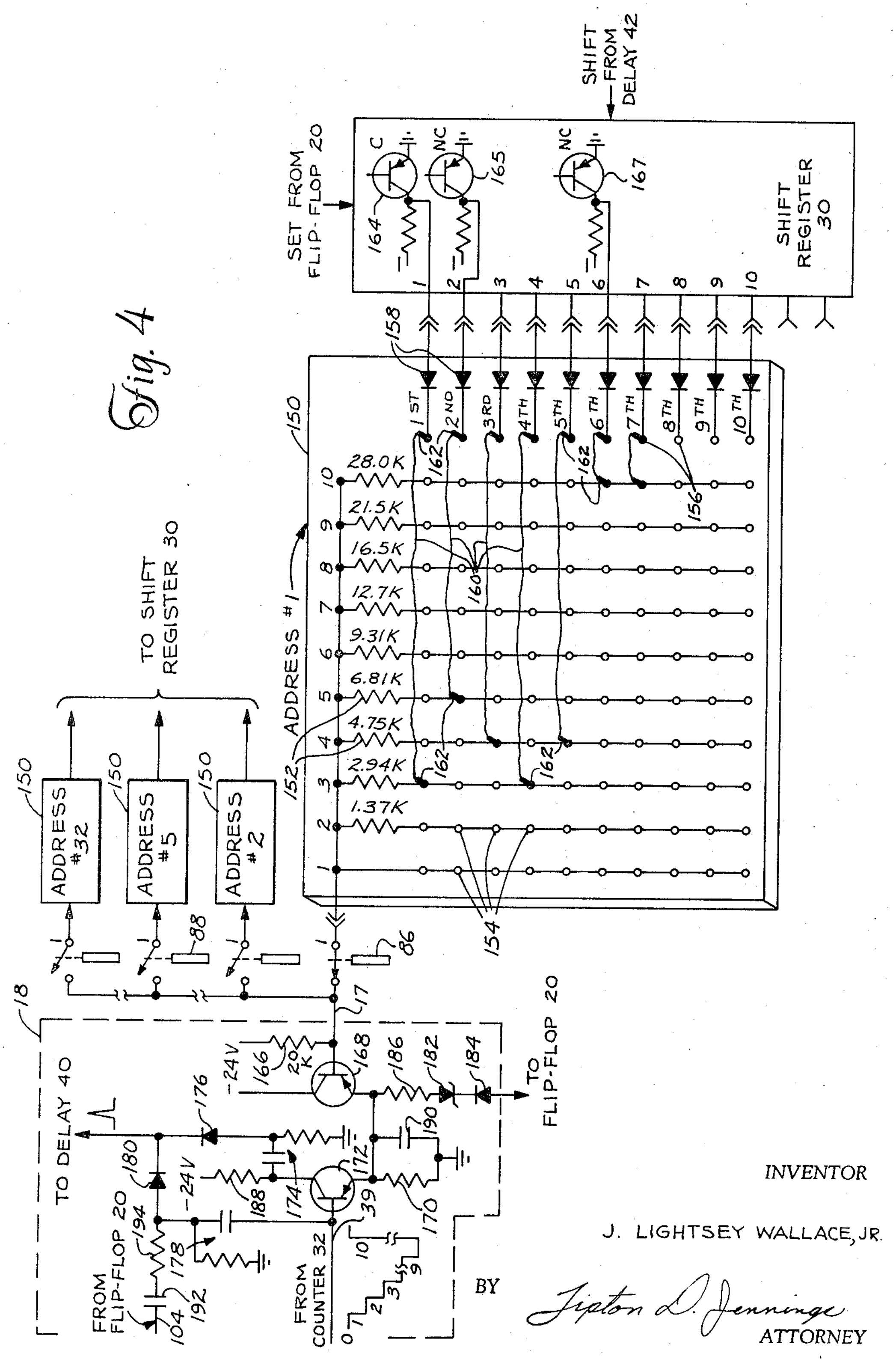

Other objects and advantages will be seen by a reading of the following description of the invention, taken in conjunction with the accompanying drawings in which:

FIGURE 1 is a block diagram of the repertory dialing apparatus shown in conjunction with several telephone sets; and FIGURES 2, 3, and 4 are schematic diagrams of portions of this apparatus.

Broadly speaking, the present invention comprises repertory call-selecting apparatus for use in conjunction with an automatic telephone system. The apparatus initiates call-selecting or dialing signals upon selection of an encoded address located in the memory or repertory. Supervision of the call-selecting sequence is performed by a comparison means which responds both to these signals and to the selected encoded address controlling thereby the issuance of the signals and resulting in the selected address being called.

Referring now to the drawings and in particular to FIGURE 1, there is illustrated in block diagram form a repertory call-selecting system having its address repertory and signalling equipment commonly accessible by a plurality of manually operable selectors 10 associated with conventional telephone instruments 12 connected in an automatic telephone system. The selectors 10 select address cards in a repertory 14 through selector relay bank 16 which connects any selected address card to a first input of a comparator 18 by line 17. The relay bank 16 is also connected to the "start" input of a conventional flip-flop 20 by line 19.

One output of flip-flop 20 drives relay 22 to switch from line 24 to line 26 the negative supply being fed the selectors 10. Line 26 also connects the negative supply to relays 16 to hold or lock the actuated selector relay in an energized condition. Another output of flip-flop 20 is connected to the start input of a second conventional flip-flop 28, to the set input of shift register 30, and to the reset input of counter 32. The output of flip-flop 28 is connected to the start input of pulse oscillator 34. Outputs from both flip-flop 28 and oscillator 34 are applied to the selectors 10 via lines 36 and 38, respectively. If desired, current amplifiers (not shown) can be inserted in lines 36, 38 to increase the signals to the selectors. The output of oscillator 34 is also connected to counter 32 whose output is in turn applied on line 39 to the second input of the comparator 18. Delay circuit 40 is actuated by one output of comparator 18. The second output of comparator 18 is connected to the stop input of flip-flop 20.

The delay circuit 40 is formed as a one-shot multivibrator whose semi-stable state exists for the inter-digit delay time of 600 milliseconds. A first output of this delay circuit is applied to a second delay circuit 42 also formed as a one-shot multivibrator, and the other output is connected back to the start input of flip-flop 28. From delay circuit 42 connection is made to the reset input of counter 32, to the stop input of flip-flop 28 and to the shift input of shift register 30. The shift register 30 is, in turn, connected to the addresses in repertory 14.

In FIGURE 2 there is shown the construction of a selector 10, here being shown as selector I associated with telephone I. The remaining selectors 10 are identical in construction to selector I and will be referenced where necessary in the description of the system. A partial showing of selector relays 16 sufficient to understand their operation is also included in this figure. In selector I there are provided a number of push-buttons 50, one side of each being connected to voltage supply line 52. Push-buttons 50 are designed to be located on the exterior of selector I for operation by the calling subscriber. Each push-button 50 will, when actuated, select a particular coded address in the repertory 14. As used in this description, an address corresponds to a telephone number.

The other sides of push-buttons 50 are connected through diodes 54 to output lines 56 numbered for convenience to correspond to the push-buttons. For example, output line 1 is connected to push-button S1 and output line 5 is connected to push-button S5. These other sides of push-buttons 50 are also connected through diodes 58 to line 60 and from there through relay 62 to ground. The contacts of relay 62 are shown in their normal position. When actuated, contact 1 connects the busy line 64 to line 60, contact 2 provides a ground path for pulse relay 66, and contact 3 provides a ground path for shunt relay 68. Diodes 70 are applied across relays 66 and 68 to protect the drive circuitry. Lamp 72 is connected between line 64 and ground.

Contact 1 of shunt relay 68 is normally idle connects line 64 to the lamp 74 when actuated. Contact 2 of this relay is also normally idle but when switched, completes a shunt circuit 76 formed in parallel with the standard shunt circuit of the dial 78 of telephone I. This auxiliary shunt circuit 76 prevents the dial pulses from being heard in the receiver of telephone I when this telephone is being automatically dialed by the system of this invention. The contact of pulse relay 66 which serves as an interrupter is normally closed and is connected by lines 80 in series with the standard pulse contact of the dialing circuit of telephone dial I. The dial circuits of all telephones used in the repertory dialing system are modified as just described to accommodate a selector 10 in order that they can be automatically dialed. As can be seen, the only actual rewiring of the telephone dialing circuit occurs in the elimination of line 82 shown in FIGURE 2 in dotted-line form. The shunt and pulse circuits are merely connected into the dialing circuitry at points 84. This wiring technique does not interfere with the conventional operation of the telephone instrument.

The selector relays 16 provide common access to the repertory for the selectors 10. In FIGURE 2 only two relays 86 and 88 are shown since they are all identical in construction. Relays 86 and 88 are designated for convenience as relay 1 and relay 5 and respectively extend to the output lines 56 of selector I designated by the numerals 1 and 5. The remaining output lines of selector I extend to other selector relays (not shown) in the relay bank 16.

Each relay 86 and 88 has three contacts of which contact 1 normally resides in the idle position and extends to a particular address in repertory 14. As shown, relay 86 will select address 1 and relay 88 will select address 5. In the closed position contact 1 connects its respective address to line 17 which extends to comparator 18. Contact 2 of each selector relay is grounded and switches between an idle or open condition and the line 19 leading to flip-flop 20. The third contact in each selector relay is connected to the line 26 and is normally idle. When switched, it connects line 26 to the input side of its relay winding to hold the relay in an energized condition.

In the operation of the automatic repertory dialing system a simple general procedure may be followed. In the usual manner the subscriber lifts the handset of his telephone 12 and listens for the dial tone to indicate that this telephone is connected to the line. He then observes the busy light 72 on his selector mechanism to see if the repertory dialing equipment is in use. If this light is unlit he is free to proceed and momentarily depresses the desired button 50 on his selector mechanism. Assuming as before that selector I and telephone I are being used, the subscriber, for example, depresses push-button S1. The automatic dialing sequence begins. Current flows from the supply through relay 22, line 24, line 52, push-button S1, conducting diode 54, output line 1 of selector I, input line 1 of relay bank 16, relay 86 to ground. Only relay 86 in the relay bank becomes energized and its contacts close. Contact 3 of relay 86 connects line 26 to the input of relay 86. Contact 2 grounds line 19 to initiate a start pulse into flip-flop 20 as later explained.

Assuming that address #1 in the repertory is programmed as telephone number 354–3400 then this encoded address is connected to comparator 18 by contact 1 of relay 86. Thus, call-selecting signals corresponding to this seven-digit address will be transmitted during the dialing sequence. In the present case the call-selecting signals will consist of D.C. dial pulses.

In selector I, closing push-button S1 also permits current to flow through the diode 58 connected to this push-button into line 60 and from there through relay 62 to ground. Relay 62 becomes energized and its three contacts close. Contact 1 connects line 64 to line 60 while contacts 2 and 3 provide a ground path for relays 66 and 68, respectively, in order that they may subsequently become energized.

The start pulse upon reaching flip-flop 20 causes this circuit to change its state of conduction resulting in the energization of relay 22. The contact of relay 22 breaks contact with line 24 and makes contact with line 26. This results in the removal of the −24 volts from line 52 in all selectors 10 including selector I and renders all of their push-buttons 50 ineffective. Thus depressing any push-button will not affect any of the selector relays 16 or relay 62 in the selectors 10. The −24-volt supply is now applied on line 26 to line 64 in all selector mechanisms 10 to light "BUSY" light 72 and thereby inform all subscribers that the repertory dialer is now in use. In selector I only, the −24 volts on line 64 also appear via closed contact 1 of relay 62 onto line 60 and holds relay 62 energized for the duration of the dialing sequence.

The −24 volts on line 26 is also applied to relay 86 in the selector relay bank 16 through contact 3 to hold relay 86 energized until the end of the dialing sequence. To prevent an inadvertent release of relay 86 or of relay 62 in selector I, relay 22 is preferably of make-before-break construction so that when energized, it will apply voltage via line 26 to the aforementioned relays before this voltage is removed from line 24.

When flip-flop 20 changed state and energized relay 22, it also sent out a start pulse to reset shift register 30 and counter 32. Shift register 30 is conventional in construction and when reset to the first or set position, applies its output to the first position of the addresses of repertory 14. Since address #1 is programmed as telephone number 354–3400 then the shift register will be initially set at the first digit of this number. During the dialing sequence the shift register will advance or step successively to the remaining digit positions so that the entire address will be scanned.

The start pulse from flip-flop 20 also switches the conducting state of flip-flop 28 which causes an output to appear on line 36 leading to the selectors 10. This output energizes shunt relay 68 in selector I because it is the only one of the selector mechanisms 10 which offers a ground path for its shunt relay via the closed contact 3 of relay 62. The remaining selectors 10 accordingly are not affected by this output of flip-flop 28. Contact 1 of relay 68 closes and in so doing completes a circuit to light lamp 74. This lamp indicates to the subscriber at selector I that the repertory dialer is functioning by virtue of its pulsating in coincidence with the energization of the shunt relay 68 as each digit in the address is dialed. Contact 2 of relay 68 also closes and a shunt circuit 76 is completed to the telephone hand set to prevent the annoying dialing clicks from reaching the ear of the subscriber.

When flip-flop 28 changes state it also releases oscillator 34, constructed as a free-running multivibrator, so that it can begin to emit pulses. The output pulses of oscillator 34 are approximately 62 ms. long in the space or "break" condition and 38 ms. long in the mark or "make" condition. Output line 38 is connected to all selectors 10; however, only relay 66 in selector I provides a ground path for the oscillator pulses via closed contact 2 of relay 62 and accordingly only telephone I will be dialed. Thus pulse relay 66 is actuated for 62 ms. at which time a negative voltage is received from oscillator 34 and is released for 38 ms. during the absence of a signal from oscillator 34. This sequence causes the contact of relay 66 in selector I to open and close rapidly to interrupt the telephone line associated with telephone I. In this manner dial pulses of 62 ms. duration and separated by 38 ms. occur on the telephone line. Such pulses will, insofar as the telephone system is concerned, appear identical to the pulses generated during the normal operation of the telephone dial mechanism.

Initially, oscillator 34 is in the make condition and remains in this condition for one make period upon being released by flip-flop 28 to permit time for the various relays to energize and for the reset pulses to perform their function. The oscillator output then undergoes a make-to-break transition and remains in the break condition for 62 ms. as aforedescribed until the break-to-make transition occurs. This signifies the completion of one dial pulse and a pulse is transmitted into counter 32.

The output of counter 32 is a staircase of ten discrete voltage steps, each step occurring upon receipt of a pulse from oscillator 32. Thus, as each dial pulse is completed the counter 32 progresses by stepping to a new voltage level and applies this output on line 39 to comparator 18. The comparator compares the voltage level received from counter 32 with a voltage level received on line 17. This latter voltage level is determined by the coded value of the first digit of address #1 in the repertory 14.

Since the first digit of address #1 has a numerical value of three, oscillator 34 must be limited to three output pulses during this first series. At the end of the third pulse, counter 32 undergoes its third step and crosses the preset voltage level determined by the first digit of address #1. The comparator 18 recognizes the equality of the two voltage amplitudes and responds by emitting a pulse to the interdigit delay circuit 40. This delay circuit is formed as a one-shot multivibrator and immediately switches to its semi-stable state to begin the interdigit delay time and also sends an output spike to the second delay circuit 42. This latter delay circuit, which is also a one-shot multivibrator, changes to its semi-stable state for 5 ms. This 5 ms. delay ensures that delay circuit 40 is definitely operating in its semi-stable state before a reset pulse is applied to the counter 32. At the end of this 5 ms. delay, multivibrator 42 returns to its stable state and applies a spike pulse to flip-flop 28, counter 32 and shift register 30.

The spike pulse applied to flip-flop 28 switches it back to its original condition removing the output from line 36 and thereby releasing relay 68 in selector I. Relay contacts 1 and 2 return to their normal position, extinguishing light 74 and removing the shunt from the telephone I. This shunt is now unnecessary because no dial pulses will be transmitted during the interdigit delay time. Flip-flop 28 also clamps the oscillator 34 so that no further pulses can be transmitted. Oscillator 34 was undergoing a break-to-make transition when it transmitted the third pulse to counter 32 and is found already in the make portion of its cycle when clamped from further oscillation by flip-flop 28. Thus, only three dial pulses are permitted to be transmitted during the dialing of the first digit of the selected address #1.

The spike pulse to counter 32 resets the counter to its original level in preparation for the second series of pulses from oscillator 34. The spike pulse to shift register 30 advances this register to its second position to permit a new voltage level to be set by the encoded second digit of the address.

At the end of the 600 ms. delay, delay circuit 40 reverts to its stable state and emits a restart spike into flip-flop 28 to start the dialing of the second digit. The afore-described procedure repeats. Briefly, flip-flop 28 once again switches states and activates shunt relay 68 in selector I to turn on lamp 74 and shunt the telephone hand set. Oscillator 34 is unclamped by flip-flop 28 and it begins to pulse relay 66 in selector I. Since the second digit has a numerical value of five, the interrupter contact of relay 66 will be actuated five times before counter 32 reaches the level which permits comparator 18 to operate. Interdigit delay circuit 40 is switched for another period of 600 ms. and delay circuit 42, after it times out in 5 ms., switches flip-flop 28 back to its normal condition to clamp oscillator 34, resets counter 32 and advance register 30 to its third poisition. This procedure repeats until the seven digits in the selected character have been dialed.

When the seventh digit in the character has been dialed, delay circuit 40 begins its delay period and delay 42 will after 5 ms. emit a pulse to switch flip-flop 28, reset counter 32 and advance register 30 to its eighth position. However, because address #1 contains only seven digits there will be no encoded digit for the eighth position of the shift register 30 to present to the comparator 18. In the absence of a coded digit the voltage level which appears at the comparator is of such a value as to immediately cause a "stop" bias level to be sent to flip-flop #20 to switch it back to its original state. Relay 22 releases, removing the —24-volt supply from line 26 and reapplying it to line 24. The lamps 72 in all selectors 10 extinguish and the relay 62 in selector I becomes de-energized returning its contacts to their idle position. With no voltage present on line 26, relay 86 in relay bank 16 becomes de-energized and its contacts return to their idle position. This disconnects address #1 in the repertory from comparator 18.

At the end of 600 ms. interdigit delay, delay circuit 40 times out and a restart pulse is as before sent to flip-flop 28. However, with flip-flop 20 now in its original state of conduction, a clamp is applied to flip-flop 28 which nullifies the effect of the pulse from delay circuit 40.

With the release of relays 22 and 86 and the timing out of interdigit delay circuit 40 the repertory dialer returns to its quiescent condition. The subscriber at telephone I then waits for call completion while the repertory dialer is free to be used by other associated subscribers. The next subscriber may have access to selector II associated with telephone II and after lifting his handset and obtaining a dial tone, he observes that his busy light 72 is unlit. He then depresses a button 50 on his selector which energizes a relay in relay bank 16, such as relay 88 associated with address #5 in repertory 14. Address #5 may be programmed as telephone number 703–536–7297 and dialing pulses corresponding to this ten-digit address will be transmitted during this new dialing sequence.

Additional schematic diagrams of portions of the repertory dialer are shown in FIGURES 3 and 4 and will be briefly described. In FIGURE 3 transistor 100 of flip-flop 20 is conducting in the normal condition and transistor 102 is non-conducting. Capacitor 106 and diode 108 provide a capacitive clamp to insure that transistor 100 conducts when power is first applied to the system. Both the start and stop pulses are applied to the base of transistor 100, the start pulse being positive and the stop pulse negative. The start pulse is formed in the circuit consisting of resistors 90 and 94, capacitor 92 and diode 96. Initially, the left side of capacitor 92 is negatively charged through resistors 90 and 94. When relay 86, for example, in relay bank 16 (FIGURE 2) is actuated, contact 2 of this relay grounds line 19 and, accordingly, the charged left side of capacitor 92. Grounding this charged side causes a positive charge to appear on its right side which discharges through resistor 94. Diode 96 conducts, passing a positive spike to transistor 100 of flip-flop 20 which causes transistor 100 to go non-conducting and transistor 102 to conduct. The output for actuating relay 22 is taken from the collector of transistor 100. This collector also applies a bias on line 104 to comparator 18 during the start condition for a purpose hereinafter explained. At the start condition the positive rise at the collector of transistor 102 is differentiated at 110 and a positive spike is passed to reset register 30 and counter 32.

In the normal condition with transistor 102 cut off, the negative voltage at the collector of transistor 102 clamps the base of transistor 112 in flip-flop 28 through diode 114 to hold this transistor conducting. Accordingly, transistor 116 is non-conducting. When transistor 102 conducts at the start pulse the D.C. clamp action of diode 114 is removed and capacitor 118 passes a positive spike to transistor 112 turning it off and transistor 116 on. The negative voltage applied to the selectors 10 by flip-flop 28 is taken from the collector of transistor 112. As shown, the positive re-start spikes from delay circuit 40 and positive stop spikes from delay circuit 42 are applied to the bases of transistors 112 and 116, respectively.

Whenever transistor 116 is non-conducting, a negative D.C. clamp through diode 121 is applied to the base of transistor 120 in oscillator 34 to hold this transistor conducting. Transistor 122 is, therefore, non-conducting and oscillator 34 is in the "make" condition. Unijunction transistor 124 is held from conducting by virtue of timing capacitor 126 being shorted by conducting diode 128 back through collector resistor of transistor 116. When transistor 116 goes conducting at the start or restart conditions, its collector rises to ground potential removing the clamp from transistor 120 and back-biasing diode 128. The oscillator 34 is now permitted to run freely. Capacitor 126 charges through "make" resistor 130, conducting diode 132 and conducting transistor 120. When capacitor 126 acquires a charge of about —12 bolts, unijunction 124 conducts from its emitter to its base 1 and capacitor 126 discharges through this conductive path and resistor 134. A positive pulse appears across this resistor which is applied to the steering circuit of the multivibrator to cause transistors 120 and 122 to switch their conductive states. Transistor 122 goes conducting, transistor 120 becomes non-conducting and the "break" cycle begins. Thus, for a definite time period after the oscillator 34 was released by flip-flop 28 the oscillator remained in the make condition and the output to the selectors 10, taken by line 38 from the collector of transistor 120, was at essentially ground potential. When the break cycle begins the collector of transistor 120 rises to approximately the negative supply resulting in a negative output voltage being supplied on line 38 for the break period.

When transistor 122 conducts, capacitor 126 charges through "break" resistor 136, conducting diode 138 and transistor 122 until the unijunction again conducts and the oscillator switches back to the "make" condition. This oscillation continues until a clamp is again applied to transistor 120 by flip-flop 28. "Breaks" resistor 136 is larger in value than "make" resistor 130 because the break and make cycles are of unequal duration, e.g., 62 ms. and 38 ms., respectively. Potentiometer 140 permits adjustment of the make-break ratio. The conducting point of unijunction 124 is determined by its intrinsic-standoff ratio. Potentiometer 142 permits the effective intrinsic-standoff ratio to be varied, and the repetition rate or speed of the oscillator 34 is directly affected.

Output to the counter 32 is also taken from the collector of transistor 120 in oscillator 34. The counter is a conventional decade scaler composed of a series of four binary stages (not shown) forming a scale of sixteen circuit with appropriate feedback to count as a scale of ten. Each positive voltage excursion of the break-to-make transition in oscillator 34 is steered as a positive spike into the first binary stage in counter 32. The output of each binary circuit is applied across a conventional resistive ladder (not shown) weighted to give an equal increment staircase output for the counter which is an analog of the digital count. The output applied to comparator 18 is for example, a staircase of nine, negative 1½-volt increments from zero to —13½ volts in response to the first nine pulses into counter 32. The tenth pulse from oscillator 34 returns all binary circuits to their zero state and accordingly the tenth step of the output is a positive 13½-volt excursion to the zero-volt level. The counter is reset by a positive voltage spike from either flip-flop 20 or delay circuit 42 to return all binaries to their zero condition, and, accordingly, the counter output to a zero-volt level.

FIGURE 4 demonstrates the cooperation between the comparator 18, selector relays 16, repertory 14 and shift register 30. Repertory 14 which provides the memory for the system can, as an example, contain thirty-two addresses 150, four of which are shown here. As aforedescribed, selector relay 86 has been actuated by button S1 in selector I, closing contact 1 of this relay and thereby selecting address #1 in repertory 14. Address #1 is shown as an address card which in practice is capable of being plugged into repertory 14 along with the other address cards 150. One input of each address card 150 is connected to contact 1 of a particular selector relay in relay bank 16 while the other inputs to the address cards 150 are commonly connected to shift register 30.

The construction of the address cards as demonstrated by address card #1 shows the input lead from contact 1 of the selector relay connected to ten columns, numbered 1 through 10, all of which column 1 is headed by a resistor 152. Electrically connected in each column are ten sockets 154 which are aligned into ten rows, here designated at the right of the card as 1st through 10th. At the right of each row, formed in another column, are ten separate sockets 156 each of which is connected to a diode 158. Each address card 150 can be programmed to any desired telephone number. To this end there is provided a wire 160 having a pin 162 at each end. To program a digit of a telephone number one pin 162 of a wire 160 is inserted into a socket 156 on the row corresponding to the digit position, and the pin 162 at the other end of the wire 160 is inserted into a socket 154 where this same row intersects the column corresponding to the numerical value of the digit. For example, address #1, which is programed for 354–3400, shows that the first digit has a wire 160 extending from socket 156 of the first row over to the socket 154 in column number three which intersects the first row. Similarly, in the second row another wire 160 extends to column number five, and so on through the seventh row where the wire extends from its socket 156 to column number ten. In address #1 the eighth, ninth, and tenth rows are not utilized.

From diodes 158 each numbered row of the address card #1 is connected to a separate input of shift register 30. Each of the other address cards 150 are connected in the same manner. Accordingly, the first row of every address card is connected to the first position of shift register 30, the second row is connected to the second position, and so forth.

At the start pulse the shift register 30 is reset to the first position by the positive spike from flip-flop 20. Transistor 164 represents the first stage of the shift register and when the register is set in the first position, transistor 164 conducts. Diode 158 in the first row of address card #1 is forward-biased. The remainder of the diodes 158 in this address card are reversed-biased since their associated transistors, as typically represented by transistors 165 and 167 in shift register 30, are non-conducting. This same condition can exist with regard to the other address cards 150; however, here their selector relays are not energized and these cards are out of the logic. With transistor 164 conducting a conductive path exists from the negative supply through resistor 166 in comparator 18, line 17, contact 1 of selector relay 86, resistor 152 in the third column of address card #1, socket 154, pin 162, wire 160, pin 162 at the other end of this wire, socket 156 in the first row, forward-biased diode 158, to ground through conducting transistor 164 in shift register 30. With current flowing through this path resistor 166, resistor 152 in column three, and the known minimal resistance of the conducting solid-state components form a voltage divider which applies a predetermined voltage level to the base of transistor 168.

Resistor 166 has a fixed value and the resistors 152 have a value based upon their column location. Appropriate resistance values are shown at the right of each resistor 152. The value of resistor 152 in column ten together with resistor 166 provides a voltage of about −14 volts at the base of transistor 168 in comparator 18. The resistance of resistor 152 in column nine causes this voltage to be approximately −12.5 volts. The resistance at column one is chosen to be zero and no resistor is used. Therefore, if the digit has a numerical value of one, the voltage on the base of transistor 168 will be just below ground potential, at about −.8 volt. This value is determined by the minimal resistance of a conducting diode 158 and a conducting transistor, such as transistor 164, of the shift register 30.

As just described, the numerical value of any digit in an address is determined by a resistance value. In other words, every digit in the address can be resistively encoded, resulting in a programmable resistive memory. Since resistance is used here as an analog of the digital (numerical) value, then in effect there is provided a programmable analog memory unit, determinative solely by resistance.

In comparator 18 transistor 168 is constructed as an emitter follower and since this transistor is conducting, the voltage at its base appears across emitter resistor 170. Resistor 170 is also the emitter resistor of transistor 172 and supplies this voltage level to the emitter of this transistor. The output staircase from counter 32 is applied to the base of transistor 172. When an address is being dialed, transistor 172 is always reversed-biased at the start of each digit in the address. For example, the first digit, having a numerical value of 3, of selected address #1 applies approximately −3.7 volts to the base of transistor 168 and, therefore, to the emitter of transistor 172. Since the counter has been reset, the staircase voltage is zero volts at the base of transistor 172 and the transistor is reversed-biased. The preset voltage level at the emitter of transistor 172 always lies approximately halfway between two levels of the counter output so that transistor 172 will conduct as the counter is stepping to a new level. At the termination of the third output pulse of oscillator 34 during the dialing of the first digit of the address, counter 32 undergoes its third step which carries the staircase level from −3.0 volts to −4.5 volts, thus passing through the preset −3.7-volt emitter voltage. Transistor 172 becomes forward-biased and its collector rises toward ground. This positive excursion is differentiated at 174 and a positive spike passes through diode 176 to switch interdigit delay circuit 40. When counter 32 is reset by delay circuit 42, the base of transistor 172 returns to zero. Simultaneously, the shift register advances to position number two and a ground path is provided for resistor 152 in the fifth column of address #1. A new voltage level is applied to the base of transistor 168 and, accordingly, to the emitter of 172 in preparation for the dialing of the second digit when the interdigit delay times out.

The above-described sequence of events repeats until the sixth digit is dialed. The sixth digit, as well as the seventh, of the selected address has a numerical value of ten corresponding to telephone "zero." Counter 32 is designed to return to zero at the tenth input pulse from oscillator 34 and, accordingly, the staircase does not go beyond the ninth level but instead returns to zero. The resistance value of the resistor 152 of column ten is selected to present a voltage level of about −14 volts to the emitter of transistor 172 which voltage is greater than the −13.5 -volt ninth level of the staircase. Even after nine pulses have been dialed for the sixth digit, transistor 172 of the comparator is still reversed-biased. At the end of the tenth pulse counter 32 returns to zero and the staircase undergoes a positive step of 13.5 volts to zero. This step is differentiated at 178 and a positive spike passes through diode 180 to interdigit delay circuit 40.

After the dialing of the seventh digit, the shift register is advanced to its eighth position. Since the selected address contains only seven digits, the socket 156 in the eighth row of address card #1 is not connected to a digit resistor 152 and no ground path is provided for resistor 166. The base of transistor 168 is driven to practically the full −24-volt supply, which voltage also appears across emitter resistor 170 and, therefore, at the anode of an 18-volt zener diode 182. This zener diode conducts and diode 184 becomes forward-biased. Current flows through current-limiting resistor 186 to the base of transistor 100 in flip-flop 20 causing it to conduct and terminate the dialing sequence.

In comparator 18 the collector resistor 188 of transistor 172 is given a larger value than emitter resistor 170. Through this relationship the voltage drop across resistor 170 will not appreciably increase when transistor 172 conducts and will prevent an inadvertent triggering of zener diode 182. Additionally, capacitor 190 provides a stable reference voltage when transistor 172 conducts to insure a sharp output spike to interdigit delay circuit 40.

When other than a ten-count has activated interdigit delay circuit 40, the reset pulse will, upon resetting counter 32 to zero, cause the staircases to return to zero and thereby undergo a positive step. Although this positive excursion is differentiated by differentiating circuit 178, diode 180 will be back-biased by the one-shot multivibrator delay circuit 40 which is now already in its semi-stable state and this spike can not affect circuit 40. However, upon the occurrence of an initial start pulse, if there is a count remaining in the counter 32 and the staircase level is not at zero, the positive excursion of the staircase to zero will be differentiated at 178 and a spike passed to interdigit delay 40 upsetting the logic. To prevent this effect, when flip-flop 20 is activated into the start condition, the negative-going transition at the collector of transistor 100 is coupled via line 104, capacitor 192 and resistor 194 to the differentiating circuit 178 thereby producing a negative charge of greater magnitude than the positive output derived from the resetting of the counter staircase. This results in a negative potential at the anode of diode 180 which inhibits the activation of the delay circuit 40.

At the end of the dialing sequence, ground is removed from the left side of capacitor 92 (FIGURE 3). This capacitor immediately recharges in order to present a start pulse to flip-flop 20 when the repertory dialer is again activated. It should be noted that this positive start spike is of sufficient duration to override any negative clamping effect which may be caused by zener diode 182, until shift register 30 is set to the first position.

As described above the repertory dialer may be associated with a large number of individual telephones to provide repertory dialing service for a multiplicity of subscribers on different telephone lines. An individual selector mechanism 10 which requires little space is conveniently located adjacent to each telephone and the remainder of the equipment including the repertory and pulse generator is located remotely at some central point where it is commonly accessible by the various telephones and selectors. This system is capable of being used not only with a multiplicity of separate subscriber telephone installations but also in a PBX installation having a number of extension telephone instruments. In this latter case the "subscriber" is the user at the extension location and the repertory can contain both three-digit or four-digit extension addresses, as well as local and long-distance addresses which are dialed after a trunk line is seized. Despite its versatility, the repertory dialing system is inexpensive to manufacture, and simple and reliable in operation.

It is apparent that various modifications may be made by one skilled in the art without departing from the spirit and scope of the present invention. For example, the comparator 18 as described herein, compares voltage amplitudes, but in view of my teaching it is apparent that a comparator could be utilized which compared other parameters such as current, frequency or time. Additionally, if a completely electronic repertory dialer is desired, it would be a simple matter to replace the electromechanical relays with conventional transistor switches. Furthermore, this system is not limited to a maximum of ten dialing pulses per digit as are the rotary dials of the conventional telephones with which this system is associated. The maximum number of pulses per digit would be limited only by the resolution of the comparator and the stability of the memory elements, here being the resistors in the address cards Therefore, it is desired that only such limitations be placed on this invention as are imposed by the prior art and set forth in the appended claims.

What is claimed is:

1. A repertory call-selecting apparatus for use with an automatic call-selecting telephone system having a plurality of individual telephone instruments and telephone lines, said apparatus comprising individual selector means associated with said telephone instruments for initiating call-selecting signals, a memory of encoded telephone addresses individually selectable by said selector means, and comparison means responsive both to said call-selecting signals and to the selected encoded address in said memory for controlling the issuance of said call-selecting signals, thereby to call the selected address.

2. A repertory call-selecting apparatus for use with an automatic call-selecting telephone system having a plurality of individual telephone instruments and telephone lines, said apparatus comprising individual selector means associated with said telephone instruments for initiating call-selecting signals, a memory of encoded telephone addresses individually selectable by said selector means, a comparator, circuit means responsive to the occurrence of said signals for supplying a varying input to said comparator, said comparator being responsive to both said varying input and the selected encoded address in said memory for controlling the issuance of said call-selecting signals, thereby to call the selected address.

3. A repertory call-selecting apparatus for use with an automatic call-selecting telephone system having a plurality of individual telephone instruments and telephone lines, said apparatus comprising individual selector means associated with said telephone instruments for initiating call-selecting signals, a comparator, a memory of encoded telephone addresses individually selectable by said selector means for establishing a predetermined input to said comparator based upon the selected address, said comparator being responsive to both said predetermined input and to said call-selecting signals for controlling the issuance of said call selecting signals, thereby to call the selected address.

4. A repertory call-selecting apparatus for use with an automatic call-selecting telephone system having a plurality of individual telephone instruments and telephone lines, said apparatus comprising individual selector means associated with said telephone instruments for initiating call-selecting signals, a comparator, a memory of encoded telephone addresses individually selectable by said selector means for establishing a predetermined input to said comparator for each digit in the selected address, circuit means responsive to the occurrence of said call-selecting signals for supplying a varying input to said comparator for each digit in said selected address, said comparator comparing for each digit said varying input with said predetermined input to control the issuance of said call-selecting signals in response thereto, thereby to call said selected address.

5. A repertory call-selecting apparatus for use with an automatic call-selecting telephone system having a plurality of individual telephone instruments and telephone lines, said apparatus comprising a signal generator, individual selector means associated with said telephone instruments for initiating the operation of said signal generator to produce call-selecting signals, a comparator, a memory of encoded telephone addresses individually selectable by said selector means for establishing a predetermined output for each digit in the selected address, circuit means responsive to the call-selecting signals generated by said signal generator to produce a varying output for each digit in the selected address, said comparator comparing for each digit the varying output of said circuit means with the predetermined output of said memory to control the generation of call-selecting signals in response thereto and thereby call the selected address.

6. A repertory call-selecting apparatus for use with an automatic call-selecting telephone system having a plurality of individual telephone instruments and telephone lines, said apparatus comprising a signal generator for generating call-selecting signals, a memory of encoded telephone addresses, selector means individually associated with each telephone instrument for selecting individual addresses in said memory and initiating operation of said signal generator, a comparator, means for establishing a predetermined input to said comparator for each digit of the selected address in said memory, circuit means responsive to the call-selecting signals generated by said signal generator to produce for each digit of the selected address a varying input to said comparator, said comparator comparing the two inputs for each digit to control the generation of call-selecting signals in response thereto and thereby call the selected address.

7. A repertory dialing apparatus for use with an automatic dialing telephone system having a plurality of individual telephone instruments and telephone lines, said apparatus comprising a memory of encoded telephone addresses, a dial pulse generator, a selector mechanism associated with each telephone instrument for selecting individual addresses in the memory and for starting operation of the dial pulse generator to produce dial pulses, means for counting said dial pulses to produce a varying output level during the dialing of each digit in the selected address, a comparator, means for applying to said comparator a predetermined input level for each digit in the selected address, said comparator for each digit comparing the varying counter output level with the predetermined input level to control the generation of the dial pulses in response thereto and thereby call the selected address.

8. Apparatus as claimed in claim 7 wherein said counter output level is a voltage which increases with the generation of each dial pulse, and the predetermined input level for each digit is a voltage determined by the numerical value of that digit.

9. A repertory dialing apparatus for use with an automatic dialing telephone system having a plurality of individual telephone instruments and telephone lines, said apparatus comprising a memory of encoded telephone addresses, a dial pulse generator, a plurality of selector mechanisms, each individually associated with a telephone instrument and having access to said memory and dial pulse generator, means responsive to the actuation of any one of said selector mechanisms for selecting a desired one of said encoded telephone addresses and for starting said dial pulse generator whereby it begins to generate dial pulses to cause transmission of dial pulses in the telephone line associated with the actuated selector mechanism, means for counting the generated pulses and providing a varying output level in response thereto, means for providing a predetermined output level for each digit of the selected address, means for comparing said two outputs during the generation of dial pulses for each digit of said selected address and terminating the pulse generation for a preset time period each time the number of generated dial pulses for each digit equals the numerical value of that digit until all dial pulses corresponding to the selected address have been transmitted in the telephone line associated with the actuated selector mechanism.

10. A repertory dialing apparatus for use with an automatic dial telephone system having at least one telephone instrument and a telephone line circuit, said apparatus comprising a memory of encoded telephone addresses, a dial pulse generator, a selector mechanism associated with said telephone instrument and having access to said memory and said dial pulse generator, a plurality of push-buttons disposed on said selector mechanism, means responsive to actuating one of said push-buttons for selecting a desired address in said memory and for energizing said dial pulse generator whereby it begins to generate dial pulses, means for counting the generated pulses and providing a varying output level in response thereto, means responsive to said selected address for providing a predetermined output level for each digit of the selected address, means for comparing said two outputs during the dialing of each digit of said selected address and for controlling the generation of dial pulses in response thereto to effect the dialing of said selected address.

11. Apparatus as claimed in claim 8 wherein said means for applying a predetermined input level includes means for scanning successively each digit of the selected address, said scanning means being set initially at the first digit of the address and thereafter advancing to the next successive digit as each digit is successively dialed.

12. Apparatus as claimed in claim 9 wherein said means for providing a predetermined output level includes means for scanning successively each digit of the selected address, said scanning means being set initially at the first digit of the address and thereafter advancing to the next successive digit during each preset time period.

13. Apparatus as claimed in claim 10 wherein the varying output level of the counting and providing means is a voltage which steps to a new level with the generation of each dial pulse, and said means for providing a predetermined output level provides a predetermined voltage level for each digit in the selected address, and said means for comparing includes means for recognizing when said two outputs are at substantially the same voltage level to terminate the generation of dialing pulses for one digit and initiate the generation of dialing pulses for the next successive digit in the selected address.

14. Apparatus as claimed in claim 13 wherein said means for providing a predetermined output level includes means for scanning successively each digit of the selected address, said scanning means being set initially at the first digit of the address and thereafter advancing to the next successive digit as each digit is successively dialed.

No references cited.

KATHLEEN H. CLAFFY, *Primary Examiner.*

ALBIN H. GESS, *Assistant Examiner.*

UNITED STATES PATENT OFFICE
CERTIFICATE OF CORRECTION

Patent No. 3,341,666 September 12, 1967

Jacob Lightsey Wallace, Jr.

It is hereby certified that error appears in the above numbered patent requiring correction and that the said Letters Patent should read as corrected below.

Column 3, line 22, after "68" insert -- which --; line 66, for "this" read -- his --; column 7, line 37, for "bolts" read -- volts --; column 8, line 31, after "which" insert -- except --; column 10, line 35, for "staircases" read -- staircase --.

Signed and sealed this 15th day of October 1968.

(SEAL)
Attest:

Edward M. Fletcher, Jr.
Attesting Officer

EDWARD J. BRENNER
Commissioner of Patents